United States Patent [19]
Bartha et al.

[11] Patent Number: 5,116,462
[45] Date of Patent: May 26, 1992

[54] METHOD OF PRODUCING MICROMECHANICAL SENSORS FOR THE AFM/STM PROFILOMETRY

[75] Inventors: Johann W. Bartha; Thomas Bayer, both of Sindelfingen; Johann Greschner, Pliezhausen; Georg Kraus, Wildberg; Helga Weiss, Boeblingen; Olaf Wolter, Aidlingen, all of Fed. Rep. of Germany

[73] Assignee: International Business Machines Corporation, Armonk, N.Y.

[21] Appl. No.: 568,286

[22] Filed: Aug. 16, 1990

[30] Foreign Application Priority Data

Aug. 16, 1989 [EP] European Pat. Off. ............ 89115099

[51] Int. Cl.⁵ .................... H01L 21/306; B44C 1/22; C03C 15/00; C03C 25/06
[52] U.S. Cl. .................... 156/643; 156/647; 156/651; 156/653; 156/657; 156/659.1; 156/661.1; 156/662
[58] Field of Search ............ 156/643, 646, 647, 651, 156/653, 657, 659.1, 661.1, 662; 252/79.1; 73/649; 310/321; 250/306; 357/69; 430/320, 323, 324; 369/170, 173; 204/192.32, 192.37

[56] References Cited

U.S. PATENT DOCUMENTS

| 4,312,117 | 1/1982 | Robillard et al. | 156/647 X |
| 4,916,002 | 4/1990 | Carver | 156/647 X |
| 4,943,719 | 7/1990 | Akamine et al. | 250/306 |
| 4,968,585 | 11/1990 | Albrecht et al. | 156/662 X |

Primary Examiner—William A. Powell
Attorney, Agent, or Firm—Robert M. Trepp

[57] ABSTRACT

A micromechanical sensor is described for the AFM/STM profilometry, incorporating a cantilever beam with at least one tip at its end and a mounting block at the opposite end. A method is described incorporating the steps of coating a wafer substrate with an insulating layer, forming a mask in the insulating layer, etching a trench in the wafer substrate, removing the insulating layer, coating the desired cantilever beam and tip material, respectively, etching the cantilever beam and tip material, and removing at least a portion of the supporting wafer material from the bottom side. The invention overcomes the problem of forming a micromechanical sensor having a cantilever beam, a tip with a predetermined shape and a mounting block.

19 Claims, 3 Drawing Sheets

METHOD OF PRODUCING MICROMECHANICAL SENSORS FOR THE AFM/STM PROFILOMETRY

BACKGROUND OF THE INVENTION

1. Field Of The Invention

The present invention relates to a method of producing micromechanical sensors for the AFM/STM profilometry, which consist of a cantilever beam with at least one tip at its end and a mounting piece at the opposite end. The invention also relates to a sensor head made in accordance with the method of the invention.

2. DESCRIPTION OF THE PRIOR ART

The scanning tunneling microscope (hereafter abbreviated STM) has stimulated the development of new techniques for microcharacterization of materials which are based on the use of a very fine tip. One of these techniques involves the atomic force microscope (hereafter abbreviated AFM) which has recently demonstrated the capability to profile and image conductors and insulators.

In the initial design of the AFM which was described by G. Binnig et al. in a publication entitled "Atomic Force Microscope," Phys. Rev. Lett. 56, 1986, p. 930–933 and in European Patent Document EP-A-0 223 918, a sensor consisting of a spring-like cantilever which is rigidly mounted at one end and carries at its free end a dielectric tip profiles the surface of an object. The force between the object's surface and the tip deflects the cantilever, and this deflection can be accurately measured, for example by a second tip which is part of an STM. A lateral spatial resolution of 3 nm has initially been achieved. Another version of the AFM includes optical detection instead of an STM detection. In this version a tungsten tip at the end of a wire is mounted on a piezoelectric transducer. The transducer vibrates the tip at the resonance frequency of the wire which acts as a cantilever, and a laser heterodyne interferometer accurately measures the amplitude of the a. c. vibration. The gradient of the force between the tip and sample modifies the compliance of the lever, hence inducing a change in vibration amplitude due to the shift of the lever resonance. Knowing the lever characteristics, one can measure the vibration amplitude as a function of the tip-sample spacing in order to deduce the gradient of the force, and thus, the force itself (Duerig UT, Gimzewski JK, Pohl DW (1986) Experimental Observation of Forces Acting During Scanning Tunneling Microscopy, Phys. Rev. Lett. 57, 2403–2406; and Martin Y, Williams CC, Wickramasinghe HK (1987) Atomic Force Microscope-Force Mapping and Profiling on a sub 100-A Scale, J. Appl. Phys. 61(10), 4723–4729).

A most critical component in the AFM is the spring-like cantilever. As a maximum deflection for a given force is needed a cantilever is required which is as soft as possible. At the same time a stiff cantilever with a high eigenfrequency is necessary in order to minimize the sensitivity to vibrational noise from the building. Usually, ambient vibrations, mainly building vibrations, are on the order of <100 Hertz. If the cantilever is chosen such that it has an eigenfrequency $f_o \leq 10$ kHz, the ambient vibrations will be attenuated to a negligible value. These requirements can only be met by reducing the geometrical dimensions of the cantilever as reflected by the following two equations:

The eigenfrequency $f_0$ of the cantilever is given by $$f_o = 0.162 \frac{t}{l^2} \sqrt{\frac{E}{\rho}} K \tag{1}$$

wherein E is Young's modulus of elasticity, $\rho$ is the density, and K is a correction factor close to unity, l is the length, and t is the thickness of the cantilever.

The spring constant of the cantilever on which its sensitivity depends is given by equation 2

$$c = \frac{F}{y} = \frac{E w t^3}{4 l^3} \tag{2}$$

wherein F is the force which causes the deflection y of the cantilever, E is Young's modulus of elasticity, w is the width, l is the length, and t is the thickness of the cantilever. In accordance with the spring constant term the sensitivity of the cantilever is dependent on its dimensions and on the material of which it consists, with the highest sensitivity being obtained for long, thin and narrow cantilever beams. The width of the cantilever beam should be sufficiently large so that lateral vibrations are suppressed. Also, the width of the beam should permit the fabrication of additional structures, such as tips, thereon. Therefore, a minimum width w of around 10 μm seems reasonable. In practice, C has to be about $\geq 1$ N/m in order to avoid instabilities during sensing of attractive forces, to prevent excessive thermal vibrations of the cantilever beam, and to obtain a measurable response.

Dimensions of a cantilever beam compatible with C=1 N/m, and $f_0$=10 kHz are for example: l=800 μm, w=75 μm, and t=5.5μm.

In the normal deflection mode of the cantilever beam forces in the order of $10_{-12}$N can be detected. The sensitivity of the sensor head can be further enhanced by vibrating the object to be profiled at the resonance frequency of of the cantilever beam, as described by G. Binnig et al. in Phys. Rev. Lett. 56 (1986), pp. 930–933. In the AFM realized in accordance with the aforementioned Binnig et al article and with EP-A-0 223 918 the requirements for cantilever and tip were met by a gold foil of about 25μm thickness, 800μm length, and 250μm width to which a diamond fragment was attached with a small amount of glue. Another proposal used microfabrication techniques to construct thin-film (1.5μm thick) $SiO_2$ microcantilevers with very low mass on which miniature cones could be grown by evaporation of material through a very small hole as described by Albrecht et al. in a publication entitled "Atomic Resolution with the Atomic Force Microscope on Conductors and Nonconductors," J. Vac. Sci. Technol., (1988), pp. 271–274.

From the foregoing description of the state of the art it was known to construct, in a first process step, cantilevers and, in a second process step, to attach tips thereto. It will be obvious to those skilled in the art that the construction of a cantilever with tip of that type is extremely delicate and prone to low yield.

The following publications relating to micromechanics are noted as examples of the prior art:

Petersen, KE, Dynamic Micromechanics on Silicon: Techniques and Devices, Vol. ED-25, No. 10, Oct. 1978, pp. 1241–1250;

Petersen, KE, Silicon as a Mechanical Material, Proc. of the IEEE, Vol. 70, No. 5, May 1982, pp. 420–457; and Jolly, RD, Muller, RS, Miniature Cantilever Beams Fabricated by Anisotropic Etching of Silicon, J. Electrochem Soc.: Solid-State Science and Technology, Dec. 1980, pp. 2750–2754.

SUMMARY OF THE INVENTION

With the method and apparatus of the present invention low-mass microcantilever beams with integrated tips can be made carrying at one end a small piece of wafer or, if necessary, a piece of Pyrex* glass (trademark of Corning Glass Works) for mounting the lever in the AFM, and at the opposite end an integrated tip for interaction with the surface of a sample to be profiled. The force and resonance frequency requirements of cantilever beam and integrated tip are met by using the microfabrication techniques. Due to the fact that cantilever and tip are made from one piece of material there are no adhesion problems between cantilever and tip.

This invention is based on an additive method which allows the fabrication of cantilever beam and tip as an integral part. For this purpose a hollow mould for the tip is made in a wafer substrate. This can be realized by reactive ion trench etching or by ani-sotropic wet etching which uses special crystallo-graphic orientations for making cone- or pyramidal shaped etch pits. Subsequently, the wafer surface including the hollow mould for the tip is coated with the desired cantilever beam and tip material. The coating can consist of one or of several layers of different materials which are applied one after the other. This process step allows the fabrication of cantilever beams of arbitrary thickness and hence of arbitrary spring constant. In the next step which comprises photolithography and subsequent dry or wet etching the cantilever beam including the tip is bared. By means of selective etching through a mask on the bottom side of the wafer the wafer which up to now served as a carrier for cantilever beam and tip is removed. If more than one layer of different materials has been applied the wafer and the respective layers excluding the top layer have to be removed by selective etching through the bottom side mask.

With the method of the invention microcantilevers with integrated tips can be made. The tips, depending on their shape, have a high aspect ratio or, owing to the utilization of special crystallographic orientations, have a highly reproducible form, and are realizable with a very low radius of curvature. As the tips are made by coating hollow moulds their mass can be considerably lower than the mass of tips which have been worked out of solid material.

It is, therefore, an object of the invention to teach a method for the construction of microcantilevers with integrated tips, which method uses a suitable combination of deposition, lithography, wet and dry etching process steps.

In a preferred embodiment the area on the top side of the cantilever beam corresponding to the remaining piece of wafer on the bottom side is bonded with a block of glass via 'mallory' bonding at about 300° C. and 1000 V.

Furthermore, the surface of the wafer substrate and the trench can be coated in a first step with a material with nonconformal step coverage, and in a second step with a material with conformal step coverage. The cantilever beam and the tip are bared in the layer with conformal step coverage, and the supporting wafer and the layer with nonconformal step coverage are removed by selective etching through the bottom side mask.

The invention also comprises a micromechanical sensor for AFM/STM profilometry which is micromechanically manufactured from one piece of material.

DESCRIPTION OF THE PREFERRED EMBODIMENT

Figure 1A:
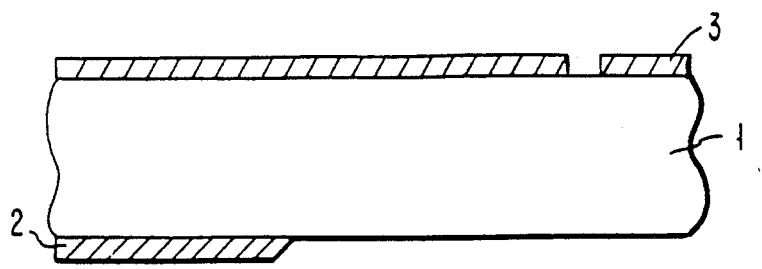
FIGS. 1A–1F show a sequence of cross-section views illustrating process steps for making a cantilever beam with integrated tip with a high aspect ratio via reactive ion etching of a trench into a substrate, which trench serves as a mould for the tip.

Referring to the drawing and in particular to FIG. 1, a silicon wafer 1 is bilaterally coated with silicon dioxide to form layers 2 and 3. Both layers 2 and 3 are thermally grown to the preferred layer thickness of about 1$\mu$m. Next, an about 3$\mu$m thick photoresist layer is applied to the silicon dioxide layer (3) on the top side of the wafer (1) (not shown). Well-known positive acting photoresists, such as AZ 1350J of the Shipley Company, or negative acting photoresists can be used for this purpose.

In a first photolithographic step the mask pattern for the reactive ion trench etching process is defined in the photoresist layer. This pattern is transferred into the silicon dioxide layer 3 to form opening 11 by wet etching or reactive ion etching under the following conditions:

etch gas: $CF_4$
pressure: about 10$\mu$bar.

Concurrently with the afore described photolithographic and reactive ion etching steps rectangular opening 12 is made in the oxide layer 2 on the bottom side of wafer 1, with the respective masks on the bottom side of the wafer being in alignment with those on the top side. The remaining photoresist is removed. The resulting structure is shown in FIG. 1A.

With the silicon dioxide layer 3 used as a mask, a trench 4 is etched into the silicon substrate 1 to a depth in the range of about 2 to 20$\mu$m under the following conditions:

etch gas: 10% of total flow Cl2/argon
pressure: about 100$\mu$bar.

Other processes for etching silicon use gas mixtures such as $SF_6$, $Cl_2$ and helium; $CCl_2F_2$ and $O_2$; or $SiF_4$, $Cl_2$, helium or argon. The resulting structure or trench 4 is shown in FIG. 1A. After etching trench 4, the silicon dioxide layer 3 is removed from the top side of the wafer 1 by wet etching in 5 : 1 buffered hydrofluoric acid. The bottom side of the wafer has to be protected during this etching step, e.g. by a baked photoresist layer.

Next, as shown in FIG. 1 C, the wafer surface 14 including deep trench 4 is coated with the desired cantilever beam and tip material 5. Suitable materials for this purpose are thermally grown or PECVD silicon dioxide; diamond-like carbon; silicon nitride, deposited by chemical vapor deposition (CVD); silicon carbide, deposited by chemical (CVD) or plasma enhanced chemical vapor deposition (PECVD), and the like. In this example silicon nitride is deposited by chemical vapor deposition from a $SiH_2Cl_2$, ammonia and argon containing atmosphere at a pressure of about 0.25 to 1.3 mbar, and a temperature of about 625° C.

Figure 1B:
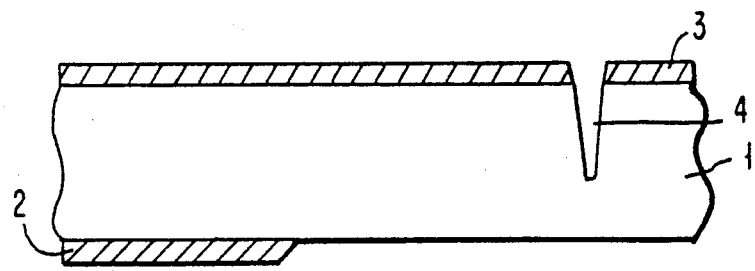
Figure 1C:
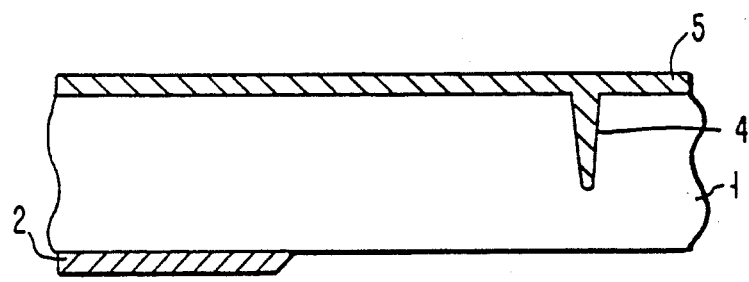
Figure 1D:
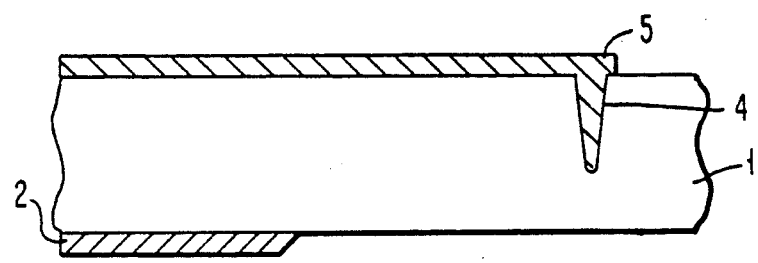

In the next step the cantilever beam outline including the tip is formed using photolithography and dry or wet etching steps on the top side or wafer surface 14 of wafer 1 as shown in FIG. 1D. For the etching of silicon nitride, a dry etching step with $CF_4$ as the etch gas and a pressure of about 50μbar is applied. By means of selective etching with aqueous KOH solution through layer 2 used as a mask on the bottom side of wafer 1, a portion of wafer 1 which up to now served as a carrier for the cantilever beam and tip material 5 is removed as shown in FIG. 1E to form cantilever beam 15 and tip 6 supported on wafer piece 16.

Figure 1E:
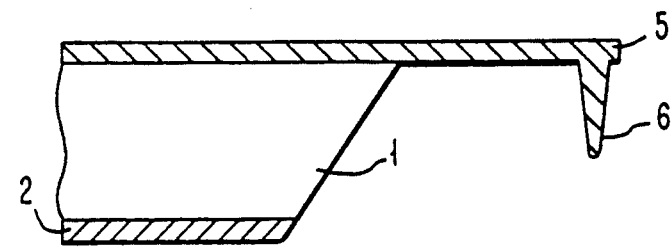
Figure 1F:
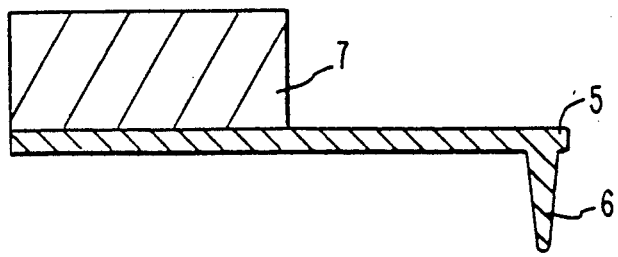

As it is sometimes more advantageous for the profiling of surfaces to mount the cantilever beam in the AFM via a block of material extending in a direction opposite to that of wafer piece 16 shown in FIG. 1E, a block of glass 7 shown in FIG. 1F is bonded with the corresponding area on the top side of the cantilever beam, and the remaining piece of wafer 16 on the bottom side of the cantilever beam is removed by etching.

In a practical example, a block of Pyrex* glass (trademark Corning Glass Works) is bonded to the cantilever beam in the area overlying the remaining silicon wafer 1 via 'mallory' bonding at a temperature of about 300° C. and by applying a voltage of about 1000 V. Subsequently, the remaining silicon wafer piece 16 is removed by etching with aqueous KOH solution. The resulting structure is shown in FIG. 1F.

Figure 2A:
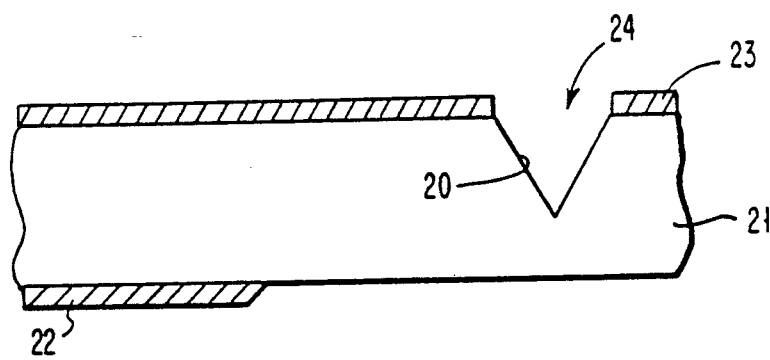
FIGS. 2A–2D show the mask and a sequence of cross-section views illustrating process steps for making a cantilever beam with integrated tip via anisotropic wet etching of a pyramidal shaped groove into the substrate, which groove serves as a mould for the tip.
Figure 2B:
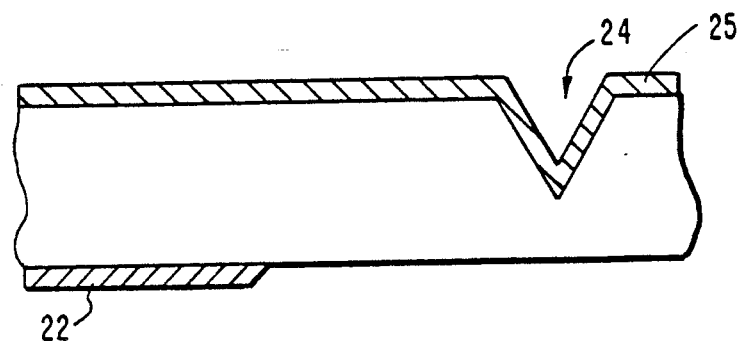
Figure 2C:
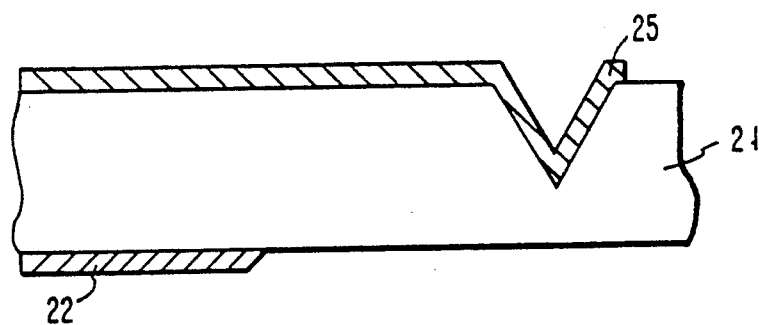

In a second example, a hollow mould 20 for shaping tip 26 is made by anisotropic wet etching of a pyramidal shaped etch pit into a standard (100) oriented wafer via mask 21 and a mask hole 22 as shown in the plan view above FIG. 2A.

The etching is performed with KOH (37.5 wt% aqueous solution). Aqueous KOH solution is an etchant which is selective with respect to the orientation as well as to the dopant concentration of the silicon crystal. The KOH etches the (111) direction at least some 100 times slower than the other directions. As a consequence by etching three-dimensional structures into bulk silicon a structure is left with etched wells having (111) side walls.

Figure 2D:
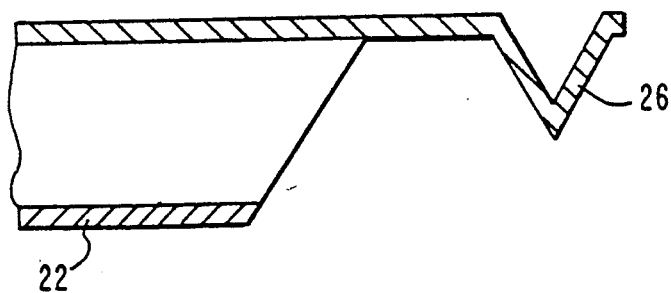

As shown in FIG. 2A, a pyramidal shaped mould 20 is etched with KOH solution into silicon substrate 21 via mask hole 21 and opening 24 in silicon dioxide layer 23 on the top side of the wafer. After silicon etching, the silicon dioxide masking material 23 is removed by etching (not shown). Subsequently, the wafer surface including the pyramidal shaped etch pit or mold 20 is coated with the desired cantilever beam and tip material 25 as shown in FIG. 2 B. In the next step the cantilever beam including tip material 25 is exposed using photolithography and dry or wet etching steps on the top side of the wafer as shown FIG. 2C. By means of selective etching with aqueous KOH solution through the mask 22 on the bottom side of the wafer 21, wafer 21 which up to now served as a carrier for the cantilever beam and tip material 25 is removed as shown in FIG. 2D to form cantilever beam 27 and tip 26 on wafer 28. All materials and process steps if not otherwise indicated are identical with those of example 1.

The resulting tip structure 26 which has been made by coating a hollow mould 20 has a minimum weight compared to a structure which has been worked out of a solid material.

Figure 3:
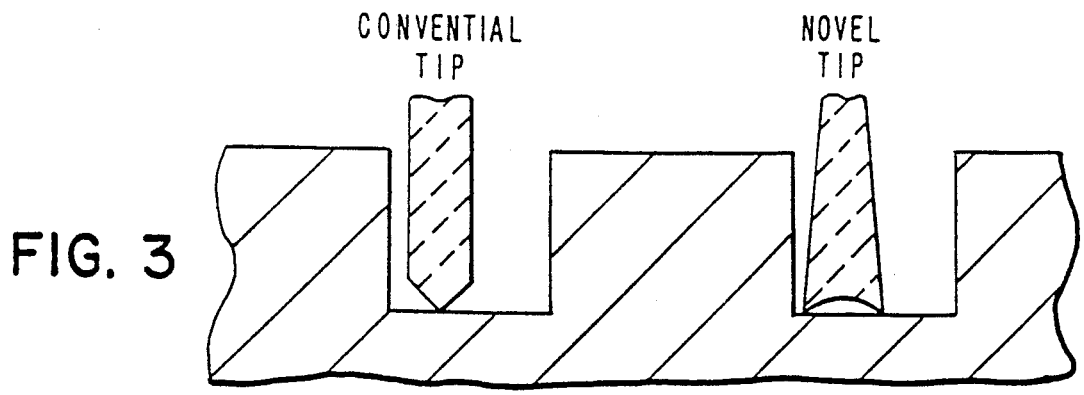
FIG. 3 shows the cross-section view of the novel tip of one preferred example of the invention in comparison with a conventional tip.

A topography, such as a trench 30, with vertical side walls 31 and rectangular corners 32 cannot be profiled with a conventional tip 33 which is shown in FIG. 3, left side. Tip 33 with this shape as shown in FIG. 3 does not reach the vertical side walls 31 or the lower corners 32 of trench 30. Therefore, a third example describes a process for making a sensor head 36 for AFM/STM profilometry which consists of a shaft 37 with one or several tips 38, 39 pointing downwards. Sensor head 36 of this kind is shown in cross-section in FIG. 3, right side. Sensor head 36 allows the profiling of vertical side walls 51 and a 90° edge or corner 52 in trench 50.

Figure 4A:
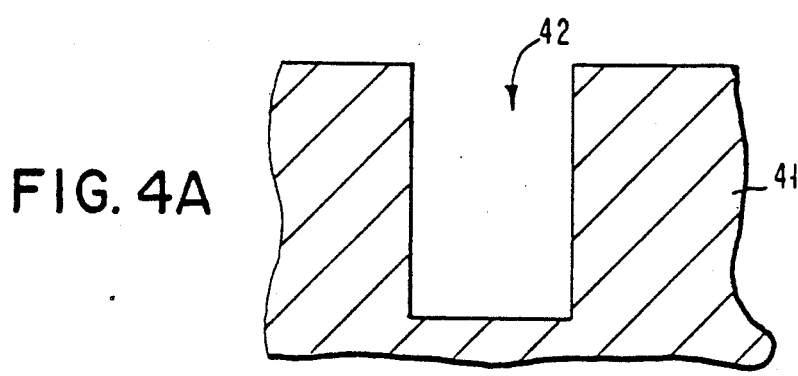
FIGS. 4A–4C show a sequence of cross-section views illustrating process steps for making the novel tip in accordance with FIG. 3.

By means of reactive ion etching, a trench 42 as shown in FIG. 4A with substantially vertical side walls and rectangular corners is etched into a base material, say a silicon substrate 41.

Typical gas mixtures for etching a trench 42 into silicon substrate 41 is described in example 1 in accordance with FIG. 1B. Apart from silicon, silicon dioxide, GaAs, or polyimide may be used as base materials. Instead of reactive ion etching, direct exposure may be used for making a trench 42 with substantially vertical side walls and rectangular corners.

Figure 4B:
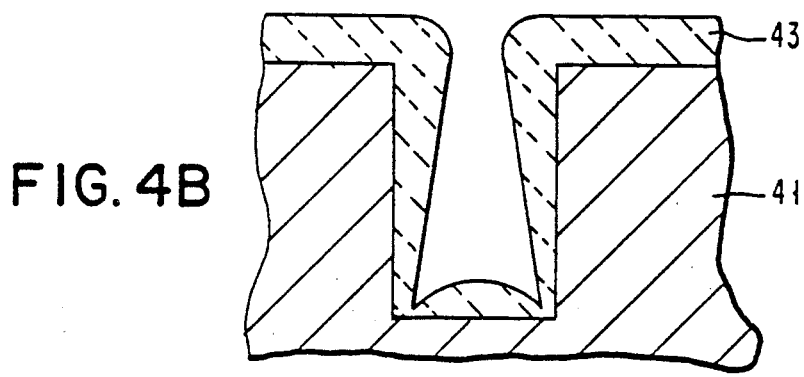

After etching, the resulting trench 42 is partly filled by chemical vapor deposition (CVD), or plasma enhanced chemical vapor deposition (PECVD), or sputtering of a material 43 which shows nonconformal step coverage in FIG. 4B. Examples for materials with nonconformal step coverage during plasma deposition are silicon nitride, silicon dioxide, amorphous silicon, tungsten silicide etc. In this example silicon nitride is deposited by PECVD from a $SiCl_2H_2$/ammonia or $SiCl_2H_2$/nitrogen gas mixture at a temperature of about 300° C., and a pressure in the range of about 500μbar.

Figure 4C:
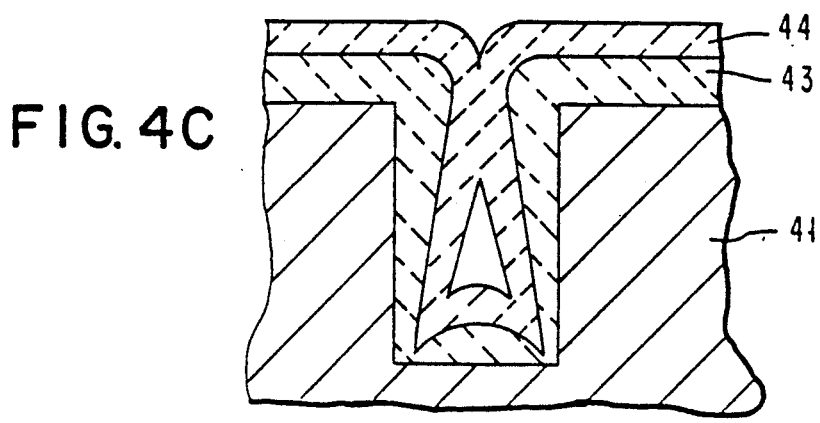

Next, the trench 42 is completely filled with a material 44 which shows conformal step coverage as shown in FIG. 4C. A material preferred for this purpose is polysilicon which is deposited by pyrolysis of a silane/-hydrogen gas mixture at a temperature of about 625° C., and under atmospheric pressure. With respect to conformal and nonconformal step coverage during PECVD of inorganic materials reference is made to a publication by A. C. Adams entitled "PLASMA DEPOSITION OF INORGANIC FILMS", Solid State Technol., 1983, pp. 135-139.

Next, the cantilever beam including the tip is bared or patterned in the top layer by applying photolithography and dry or wet etching steps on the top side of the wafer (not shown). For polysilicon reactive ion etching is applied with $CF_4$ as etch gas, and with a pressure of about 25μbar. By selective etching from the bottom side of the topography the wafer 41 and layer 43 are removed (not shown). For the etching of silicon 41 an aqueous KOH solution is used. Fot the etching of silicon nitride 43 a concentrated aqueous hydrogen fluoride solution is applied. During these etching steps the top side of the topography (consisting of polysilicon) has to be protected, e. g. by a PECVD silicon dioxide layer.

For the STM profilometry the tips made in accordance with this invention may carry a metallic coating.

While the invention has been described with respect to selected examples thereof, it will be apparent to those skilled in the art that variations can be made thereto without departing from the spirit and scope of the present invention.

We claim:

1. A method of producing micromechanical sensors for the AFM/STM profilometry, which consist of a cantilever beam with at least one tip at its end and a mounting piece at the opposite, comprising the following steps:
   first, coating the top and bottom sides of a wafer substrate to form a first and second insulating layer respectively;
   second, producing a mask in said first insulating layer on the top side of the wafer
   third, producing a mask in said second insulating layer on the bottom side of the wafer;
   fourth, etching a trench in the wafer substrate utilizing said first layer mask;
   fifth, removing said first insulating layer from the top side of said wafer substrate by etching;
   sixth, coating the top side of the wafer and the trench with the desired cantilever beam and tip material respectively;
   seventh, forming said cantilever beam and tip in a second photolithographic step and dry or wet etching steps, respectively; and
   eighth, removing the supporting wafer material from the bottom side of said wafer by etching through said second layer.

2. The method of claim 1, wherein the wafer substrate is selected from the group consisting of monocrystalline silicon, silicon dioxide, GaAs, and polyimide.

3. The method of claim 1, wherein said step of second producing includes the ninth step of producing a silicon dioxide layer to a layer thickness of about 1 $\mu$m.

4. The method of claim 3, wherein said ninth step includes a tenth step of applying about 3 $\mu$m thick photoresist layer to the silicon dioxide layer on the top side of the wafer, and wherein said second producing step includes an eleventh photographic step whereby the desired mask pattern is defined in said photoresist layer on the top side.

5. The method of claim 4, wherein said step of second producing includes a twelfth step of transferring said mask pattern in the photoresist layer into said silicon dioxide layer by etching.

6. The method of claim 5, wherein said tenth step, said eleventh photolithographic step and said twelfth step of transferring are simultaneously made respectively in the second insulating layer on the bottom side of said wafer substrate.

7. The method of claim 1, wherein a trench is etched into the silicon wafer substrate to a depth in the range of about 2 to 20 $\mu$m by reactive ion etching with 10% of total flow chlorine/residue argon as etch gas, and with a pressure of about 100 $\mu$bar.

8. The method of claim 1, wherein a pyramidal shaped groove is etched into the silicon wafer substrate by anisotropic wet etching with an aqueous KOH solution.

9. The method of claim 1, wherein the silicon dioxide layer is removed from the top side of the wafer by wet etching with 5 : 1 buffered hydrofluoric acid.

10. The method of claim 8, wherein the wafer surface including said deep trench or said pyramidal shaped groove is coated with the cantilever beam and tip material which is selected from the group consisting of thermally grown silicon dioxide, PECVD silicon dioxide, diamond-like carbon, CVD silicon nitride, CVD silicon carbide and PECVD silicon carbide.

11. The method of claim 10, wherein the wafer surface is coated with silicon nitride which is deposited from a $SiCl_2H_2$, ammonia, and argon containing atmosphere at a pressure of about 0.25 to 1.3 mbar, and a temperature of about 625° C.

12. The method of claim 11, wherein the silicon nitride cantilever beam including the tip is bared in a second photolithographic step, followed by reactive ion etching with $CF_4$ as etch gas, and with a pressure of about 50 $\mu$bar.

13. The method of claim 1, wherein the supporting silicon wafer material is removed from the bottom side by anisotropic wet etching with an aqueous KOH solution (37.5 wt%).

14. The method of claim 1, further comprising the steps of bonding the area on the top side of the cantilever beam corresponding to the remaining piece of wafer on the bottom side with a block of glass, and subsequently removing the remaining piece of wafer by selective etching.

15. The method of claim 14, wherein the block of glass is bonded with the cantilever beam via 'mallory' bonding at a temperature of about 300° C. and by applying a voltage of about 1000 V.

16. The method of claim 1, further comprising the steps of:
   coating the surface of the wafer and the trench with several layers of different materials;
   baring cantilever beam and tip in the top layer by a second photolithographic step and dry or wet etching steps, respectively; and
   removing the supporting wafer material and the respective layers by selective etching through the bottom side mask.

17. The method of claim 16, wherein the surface of the wafer substrate and the trench is coated in a first step with a material which shows nonconformal step coverage, and in a second step with a material which shows conformal step coverage.

18. The method of claim 17, wherein the material with nonconformal step coverage during plasma deposition is selected from the group consisting of silicon nitride, silicon dioxide, amorphous silicon, and tungsten silicide.

19. The method of claim 16, wherein the surface of the silicon wafer substrate and the trench is coated in a first step with PECVD silicon nitride, and in a second step with poly-silicon;
   the cantilever beam and the tip are bared in the polysilicon layer by photolithography and reactive ion etching with $CF_4$ as etch gas, and with a pressure of about 25 $\mu$bar; and wherein the silicon wafer substrate and the silicon nitride layer are removed by wet etching through the bottom side mask with aqueous KOH solution, and concentrated aqueous hydrogen fluoride solution, respectively.

* * * * *